UNITED STATES PATENT OFFICE.

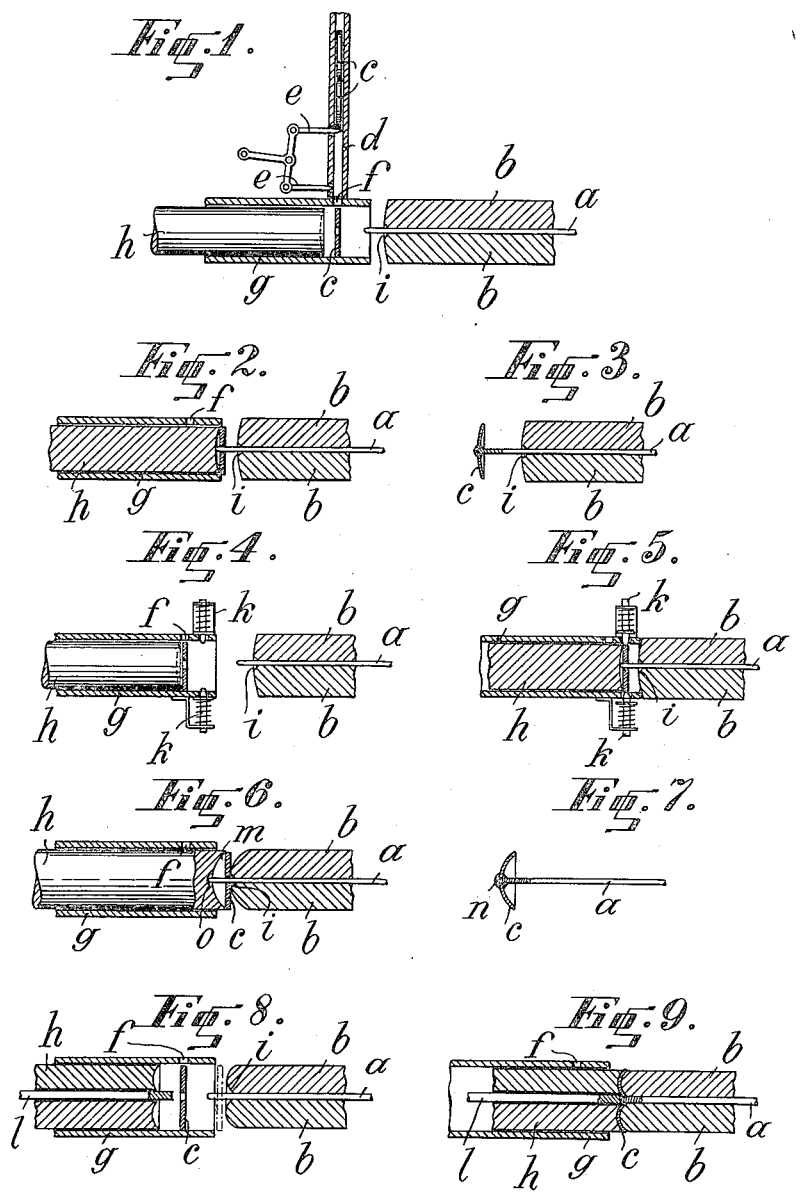

MAX HANDKE, OF BERLIN, GERMANY.

DEVICE FOR RIVETING WIRE PINS TO HEAD-PLATES ON BOTH SIDES.

1,262,334. Specification of Letters Patent. Patented Apr. 9, 1918.

Application filed June 12, 1914. Serial No. 844,827.

*To all whom it may concern:*

Be it known that I, MAX HANDKE, a subject of the German Emperor, residing at 6 Flottwellstrasse, Berlin, Prussia, Germany, have invented a certain new and useful Device for Riveting Wire Pins to Head-Plates on Both Sides, of which the following is a specification.

Hitherto it has been necessary in order rigidly to connect wire pins to perforated head plates, as, for example, in the manufacture of drawing pins, carpet and upholstery pins and the like to form a protuberance on the shank of the pin and then to clamp the head plate between this protuberance and the end of the pin by upsetting the latter.

The device which forms the object of the present invention renders it possible to dispense with this protuberance, as it effects riveting on both sides. This also renders it possible to form the pin from a continuous wire, an advantage which it has hitherto been impossible to secure when employing perforated head plates.

The desired object is attained owing to the fact that the pin or wire is held between clamping jaws and the perforated head plates are conducted separately to the end of the pin in such a manner that on both sides of the head plate thus for the time being passed onto the wire, a length of pin or wire remains free. Consequently when the upsetting operation is subsequently effected, a rivet head is formed at each side of the plate.

Several forms of the device according to the invention are illustrated, by way of example, in the accompanying diagrammatic drawings.

Figure 1 is a sectional elevation of one arrangement of the device according to the invention.

Figs. 2 and 3 illustrate different stages in the fitting of the head plate to the pin.

Fig. 4 is a sectional elevation of a modified arrangement.

Fig. 5 illustrates the action of the parts of the arrangement illustrated in Fig. 4.

Fig. 6 is a sectional elevation of a further modification.

Fig. 7 shows the pin as finished by the arrangement shown in Fig. 6.

Figs. 8 and 9 show a further modification by which the head plates may be given a determined form.

Referring to Fig. 1 the wire $a$ intended for forming the pins is held between two clamping jaws $b$ and is fed intermittently in an appropriate manner. The head plates $c$ are supplied through a guide channel $d$ the separation of the individual head plates being effected in a known manner, for example, by means of two fingers $e$ displaced in opposite directions. The head plate that has been released falls through a slot $f$ into a sleeve $g$ in which it advantageously under the action of friction or is exposed to a certain resilient pressure in its forward displacement by the plunger $h$. The wire $a$ protrudes from the clamping jaws to such an extent that it enters the sleeve $g$ slightly, thereby insuring the head plate being passed onto the wire, as the head plate only leaves the sleeve $g$ after it has been guided onto the wire $a$. As shown in Fig. 2, a short length of wire remains free on both sides of the plate $c$ passed thereon, so that in the subsequent upsetting by the plunger $h$ a rivet head is formed on both sides. The wire $a$ with the head plate $c$ riveted thereon, is then fed for a given length (see Fig. 3) and finally the wire is severed.

It is advantageous to provide a small swage $i$ behind the head in the clamps $b$ for forming the rivet.

In the arrangement according to the invention hereinbefore described the head plates $c$ are supplied automatically. It is however, obvious that they might be inserted in the sleeve $g$ by hand.

In order to insure the head plates being passed onto the pin or end of the wire with certainty, the plunger $h$ may be magnetized so that the head plates adhere firmly to it until they have been riveted. The sleeve $g$ surrounding the plunger should preferably be of non-magnetic material such as brass.

The arrangement according to the invention illustrated in Figs. 4 and 5 differs from that previously described only in the method of supplying and retaining the head plates. For this purpose the sleeve $g$ is provided with resilient stops $k$ which prevent the head plate $c$ from falling over and insure the maintenance of an upright position. In this construction the sleeve $g$ is displaceable and through the intermediary of the stops $k$ participates to a certain extent in the displacement of the plunger $h$ until it is stopped by the clamping jaws $b$. The spring stops $k$ are then pressed back by the plunger $h$ or the head plate $c$ located in front of it (see Fig. 5) so that they do not present any obstacle to the riveting operation. The sleeve $g$ may conveniently be returned to its initial position by spring action.

With the displaceable arrangement of the sleeve just described, it is not necessary for the wire to project into it in the first place as the sleeve is subsequently displaced by a suitable amount toward the clamping jaws $b$.

It will be obvious that in the arrangement according to the invention illustrated in Figs. 4 and 5 the plunger $h$ might be fixed and the clamping jaws $b$ be displaced with the wire $a$ toward it the resilient sleeve $g$ being pressed back by the clamping jaws.

In the upsetting operation, in order to prevent the yielding of the end of the wire protruding from the head plate $c$ and to form it into a rounded rivet head $n$, the plunger, in addition to the cavity $m$, comprises a special recess $o$ at the center in which the end of the wire engages and is formed into a rounded rivet head.

If it be desired to form a larger rivet head, the cavity $m$ in the riveting plunger $h$ is made of corresponding depth as shown in Fig. 6. The result of this arrangement is that the pin or wire $a$ extends to a correspondingly larger extent through the head plate $c$, thus providing sufficient material for the formation of a larger head $n$ (see Fig. 7). Owing to the provision of the deep cavity $m$ the plate $c$ is given a somewhat pronounced arched formation, but if this should not be desired, it can be reduced or altogether eliminated by retractive pressure.

In the manufacture of carpet pins, upholstery pins and so forth, in order to give an appropriate form to the head plate or to emboss it simultaneously with the riveting operation or immediately thereafter, as shown in Figs. 8 and 9 the upsetting members $b$ and $h$ are suitably shaped for this purpose. By this means the head plates, which have so far been flat are given a definite arched or the like form or embossed with a definite pattern. In this case it is advantageous to fashion the head plate after the pin has been riveted. With this object a special riveting pin $l$ may be resiliently mounted in the plunger $h$. This pin protrudes somewhat from the plunger so that it effects the riveting before the plunger $h$ becomes operative. After the riveting has been effected, this pin $l$ is pressed back by the increasing pressure on the plunger $h$ and the plate $c$ is fashioned.

What I claim as my invention and desire to secure by Letters Patent is:—

1. Apparatus for riveting a wire pin to a perforated head plate on both sides of the plate, comprising a clamp for holding the wire and forming a matrix, a plunger in line therewith having a working head facing the matrix formed by the clamp, and a holder for the perforated head plates arranged between the matrix formed by the clamp and the plunger's working head.

2. Apparatus for riveting a wire pin to a perforated head plate on both sides of the plate, comprising a clamp for holding the wire and forming a matrix, a plunger in line therewith and a holder for the perforated head plates mounted on the plunger.

3. Apparatus for riveting a wire pin to a perforated head plate on both sides of the plate, comprising a clamp for holding the wire and forming a matrix, a plunger in line therewith, and a holder for the perforated head plates in the form of a sleeve and movably arranged on the plunger.

4. Apparatus for riveting a wire pin to a perforated head plate on both sides of the plate, comprising a wire-clamp forming a matrix, a plunger in line therewith, and a sleeve movably arranged on the plunger projecting beyond the same, the sleeve having in its forepart a cross-slot for the entrance of the head plate.

5. Apparatus for riveting a wire pin to a head plate on both sides of the plate, comprising a wire-clamp forming a matrix, a plunger in line therewith, and a holder for the head plates in the form of a sleeve and surrounding the plunger, the plunger being magnetized, while the sleeve is of non-magnetic material, substantially as and for the purpose described.

6. Apparatus for riveting a wire pin to a head plate on both sides of the plate, comprising a wire-clamp forming a matrix, a plunger in line therewith, and a holder for the head plates, in the form of a sleeve and surrounding the plunger, the said sleeve having resilient stops for retaining in upright position a head plate introduced therein.

7. Apparatus for riveting a wire pin to a head plate on both sides of the plate, comprising a wire-clamp forming a matrix, a plunger in line therewith, and a holder for the head plates, in the form of a sleeve and surrounding the plunger, the plunger having a recessed front face substantially as and for the purpose described.

8. Apparatus for riveting a wire pin to a head plate on both sides of the plate, comprising a wire-clamp forming a matrix, a plunger in line therewith, and a holder for the head plates, in the form of a sleeve and surrounding the plunger, the plunger having a recess in its front face for receiving the end portion of the pin after the pin has passed through and beyond a head plate due to relative movement between the plunger and the wire-clamp, substantially as and for the purpose described.

9. Apparatus for riveting a wire pin to a head plate on both sides of the plate, comprising a wire-clamp forming a matrix, a plunger in line therewith, and a holder for the head plates, in the form of a sleeve and surrounding the plunger, and a riveting pin resiliently arranged in a hole in the center of the plunger and protruding from the latter, substantially as and for the purpose described.

In testimony whereof I have hereunto signed my name to this specification in the presence of two subscribing witnesses.

MAX HANDKE.

Witnesses:
  MAX GOLDNISCH,
  HENRY HASPER.